US009852208B2

(12) United States Patent
Chari et al.

(10) Patent No.: US 9,852,208 B2
(45) Date of Patent: Dec. 26, 2017

(54) DISCOVERING COMMUNITIES AND EXPERTISE OF USERS USING SEMANTIC ANALYSIS OF RESOURCE ACCESS LOGS

(71) Applicant: International Business Machines Corporation, Armonk, NY (US)

(72) Inventors: Suresh N. Chari, Tarrytown, NY (US); Ian M. Molloy, Chappaqua, NY (US); Youngja Park, Princeton, NJ (US)

(73) Assignee: International Business Machines Corporation, Armonk, NY (US)

( * ) Notice: Subject to any disclaimer, the term of this patent is extended or adjusted under 35 U.S.C. 154(b) by 834 days.

(21) Appl. No.: 14/189,274

(22) Filed: Feb. 25, 2014

(65) Prior Publication Data
US 2015/0242486 A1 Aug. 27, 2015

(51) Int. Cl.
*G06F 17/30* (2006.01)
*H04L 29/06* (2006.01)
*H04L 29/08* (2006.01)

(52) U.S. Cl.
CPC .. *G06F 17/30598* (2013.01); *G06F 17/30705* (2013.01); *H04L 63/104* (2013.01); *H04L 65/403* (2013.01); *H04L 67/22* (2013.01); *H04L 67/306* (2013.01)

(58) Field of Classification Search
CPC ......... G06F 17/30598; G06F 17/30705; H04L 65/403; H04L 67/306; H04L 67/22; H04L 63/104
USPC .......................................................... 707/737
See application file for complete search history.

(56) References Cited

U.S. PATENT DOCUMENTS

| 8,055,803 B1* | 11/2011 | Issa | G06Q 10/00 709/223 |
| 8,086,480 B2* | 12/2011 | Deo | G06Q 30/00 705/7.29 |
| 8,185,584 B2* | 5/2012 | Fischer | G06Q 10/10 709/204 |
| 8,185,643 B2* | 5/2012 | McMullen | G06F 21/6218 707/608 |

(Continued)

OTHER PUBLICATIONS

Khan et al., "Applying Process Mining in SOA Environments," Proceedings of the 2009 International Conference on Service-Oriented Computing (ICSOC/ServiceWave'09), Nov. 2009, pp. 293-302.

(Continued)

*Primary Examiner* — Miranda Le
(74) *Attorney, Agent, or Firm* — Yee & Associates, P.C.; Jeffrey S. LaBaw

(57) ABSTRACT

Generating communities of users and discovering the expertise of those users are provided. Identifications of a plurality of users that accessed resources via a network, types of actions performed by the plurality of users on the resources, and names of the resources accessed by the plurality of users are extracted from retrieved resource access logs. The plurality of users are grouped into a plurality of different sets of users based on which resources were accessed and which type of actions were performed by each particular user within the plurality of users. The communities of users are generated based on each different set of users having a similarity with regard to the resources that were accessed and the types of actions that were performed by a particular set of users.

16 Claims, 8 Drawing Sheets

(56) References Cited

U.S. PATENT DOCUMENTS

| | | | |
|---|---|---|---|
| 8,370,947 B2 | 2/2013 | Zaitsey et al. | |
| 8,516,107 B2* | 8/2013 | Ramstrom | G06F 21/604 709/224 |
| 8,543,532 B2* | 9/2013 | Sathish | G06Q 10/1053 706/55 |
| 8,612,435 B2* | 12/2013 | Sambrani | G06F 17/30702 707/734 |
| 8,694,514 B2* | 4/2014 | Frieden | G06F 17/30867 707/749 |
| 8,775,471 B1* | 7/2014 | Kozyrczak | G06F 17/30861 707/748 |
| 8,812,593 B2* | 8/2014 | Chirita | H04L 67/306 709/204 |
| 8,880,600 B2* | 11/2014 | Lento | G06Q 10/10 455/435.1 |
| 8,886,799 B1* | 11/2014 | Zhang | G06Q 30/0241 709/218 |
| 9,385,985 B2* | 7/2016 | Cooper | H04L 51/28 |
| 2005/0021499 A1* | 1/2005 | Bradley | G06F 17/30867 |
| 2006/0253418 A1* | 11/2006 | Charnock | G06F 17/30716 |
| 2007/0299631 A1* | 12/2007 | Macbeth | G06F 11/3476 702/187 |
| 2008/0086473 A1* | 4/2008 | Searl | G06F 21/552 |
| 2008/0271143 A1 | 10/2008 | Stephens et al. | |
| 2009/0222557 A1* | 9/2009 | Rudy | G06F 17/30867 709/224 |
| 2010/0093308 A1* | 4/2010 | Cohan | H04L 63/0263 455/405 |
| 2011/0029505 A1* | 2/2011 | Scholz | G06F 17/30539 707/711 |
| 2011/0082848 A1 | 4/2011 | Goldentouch | |
| 2012/0059767 A1* | 3/2012 | Uthmann | G06Q 90/00 705/319 |
| 2012/0066738 A1* | 3/2012 | Cohan | H04L 63/0263 726/1 |
| 2012/0078906 A1* | 3/2012 | Anand | G06F 17/30702 707/737 |
| 2012/0089598 A1* | 4/2012 | Oztekin | G06F 17/30867 707/723 |
| 2012/0137367 A1 | 5/2012 | Dupont et al. | |
| 2012/0260182 A1 | 10/2012 | Hansen et al. | |
| 2013/0132468 A1* | 5/2013 | Azeez | G06F 17/30861 709/203 |
| 2015/0063186 A1* | 3/2015 | Kakadia | H04W 4/06 370/312 |

OTHER PUBLICATIONS

Martinez et al., "Combining qualitative evaluation and social network analysis for the study of classroom social interactions," Computers & Education vol. 41, No. 4, Dec. 2003, pp. 353-368.

Miller, "Cyberspace and Real-World Behavioral Relationships: Towards the Applications of Interest Search Queries to Identify Individuals at-Risk for Suicide," Masters Thesis, Air Force Institute of Technology, Jun. 2012, 116 pages.

Van Der Aalst, "Business alignment: using process mining as a tool for Delta analysis and conformance testing," Requirements Engineering, vol. 10, No. 5, Aug. 2005, pp. 198-211.

Van Der Aalst et al., "Discovering Social Networks from Event Logs," Computer Supported Cooperative Work, vol. 14, No. 6, Dec. 2005, pp. 549-593.

* cited by examiner

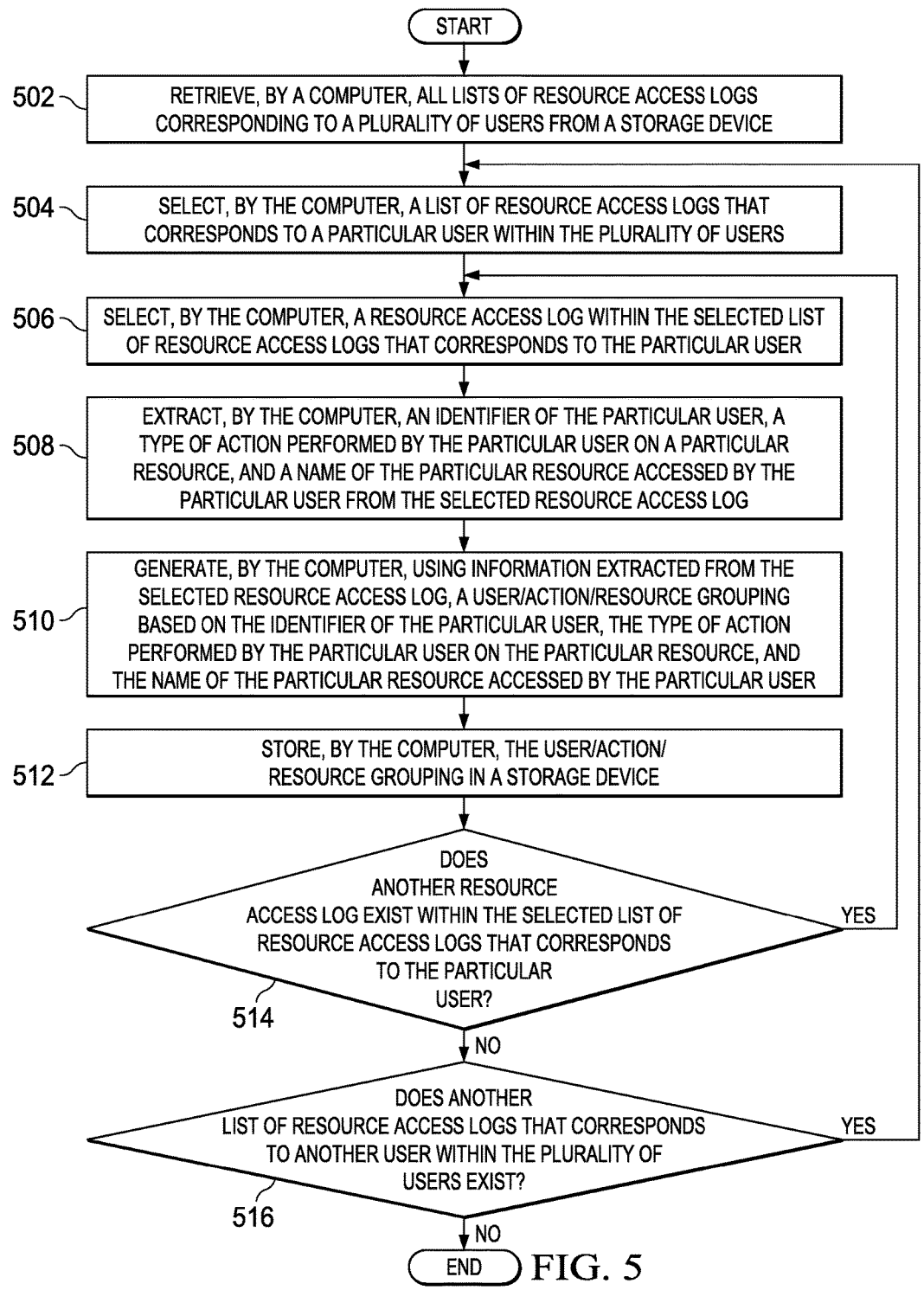

DISCOVERING COMMUNITIES AND EXPERTISE OF USERS USING SEMANTIC ANALYSIS OF RESOURCE ACCESS LOGS

BACKGROUND

1. Field

The disclosure relates generally to user communities and more specifically to discovering communities of users accessing resources via a network and discovering the expertise of those users by utilizing semantic analysis of access logs associated with the resources accessed by the users.

2. Description of the Related Art

Related bodies of work belong to one of the two directions. The first direction is social network analysis. Social network analysis has gained a lot of attention, especially with regard to recommender systems. Existing social network analysis approaches mine social networks to determine social communities of users based on explicit connections, such as, for example, "friends", "followers", and "circles", or implicit communications, such as, for example, e-mail messages, instant messages, text messages, and small message system messages, made by the users. These social communities based on communications between users may contain both personal roles and professional roles. The second direction is role mining in computer security. Role analysis is the process of determining roles of these users and assigning to each user a permission associated with the particular role by utilizing role-to-permission mapping. Existing role analysis approaches apply various data mining techniques over the role-to-permission matrix to produce different sets of user groups. Each user in a particular user group exercises a similar set of permissions. These roles are however functional roles and are not based on semantic or logical roles.

SUMMARY

According to one illustrative embodiment, a computer-implemented method for generating communities of users is provided. A computer extracts identifications of a plurality of users that accessed resources via a network, types of actions performed by the plurality of users on the resources, and names of the resources accessed by the plurality of users from retrieved resource access logs. The computer groups the plurality of users into a plurality of different sets of users based on which resources were accessed and which type of actions were performed by each particular user within the plurality of users. The computer generates the communities of users based on each different set of users having a similarity with regard to the resources that were accessed and the types of actions that were performed by a particular set of users. According to other illustrative embodiments, a computer system and a computer program product for generating communities of users are provided.

BRIEF DESCRIPTION OF THE SEVERAL VIEWS OF THE DRAWINGS

FIG. 5 is a flowchart illustrating a process for generating user/action/resource groupings based on information extracted from resource access logs in accordance with an illustrative embodiment;

DETAILED DESCRIPTION

Figure 1:
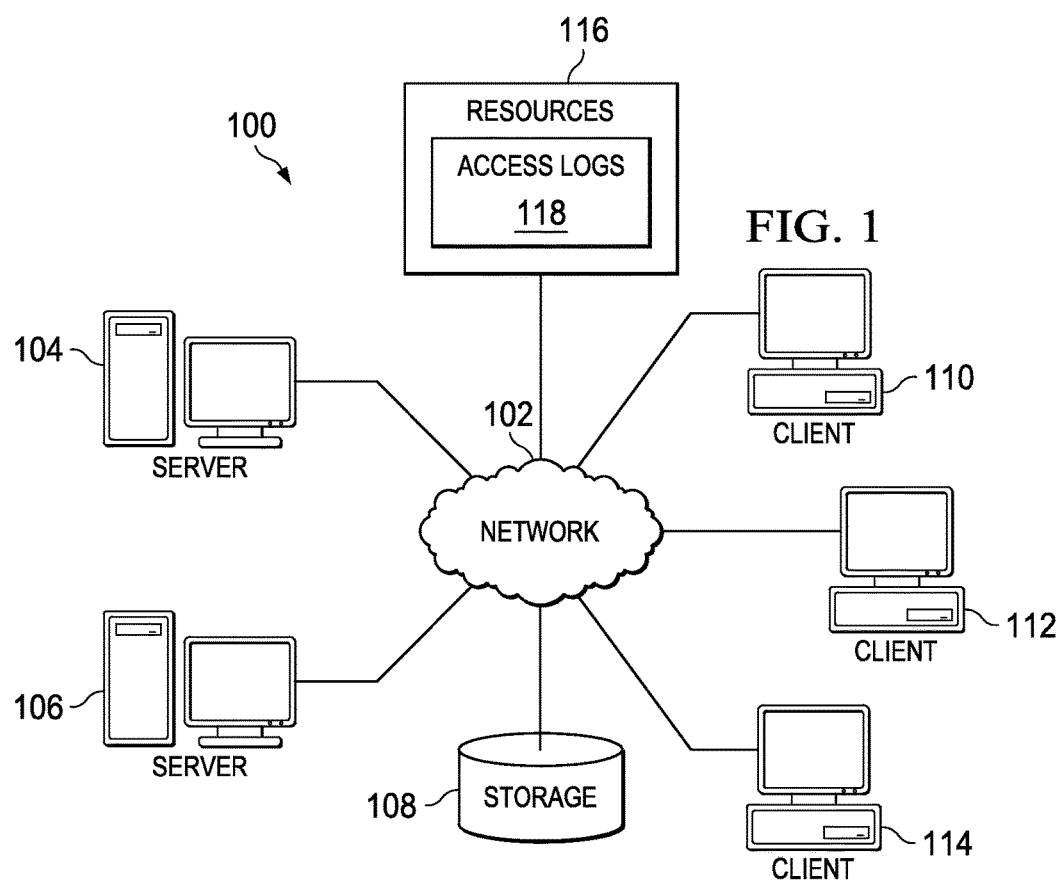
FIG. 1 is a pictorial representation of a network of data processing systems in which illustrative embodiments may be implemented.

As will be appreciated by one skilled in the art, aspects of the illustrative embodiments may be embodied as a computer system, computer-implemented method, or computer program product. Accordingly, aspects of the illustrative embodiments may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the illustrative embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can store a program for use by or in connection with an instruction execution system, apparatus, or device. In addition, a computer readable storage medium does not include a propagation medium, such as a signal or carrier wave.

A computer readable signal medium may include a propagated data signal with computer readable program code embodied therein, for example, in baseband or as part of a carrier wave. Such a propagated signal may take any of a variety of forms, including, but not limited to, electro-magnetic, infra-red, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the illustrative embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the illustrative embodiments are described below with reference to flowchart illustrations and/or block diagrams of computer-implemented methods, computer systems, and computer program products according to illustrative embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions also may be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
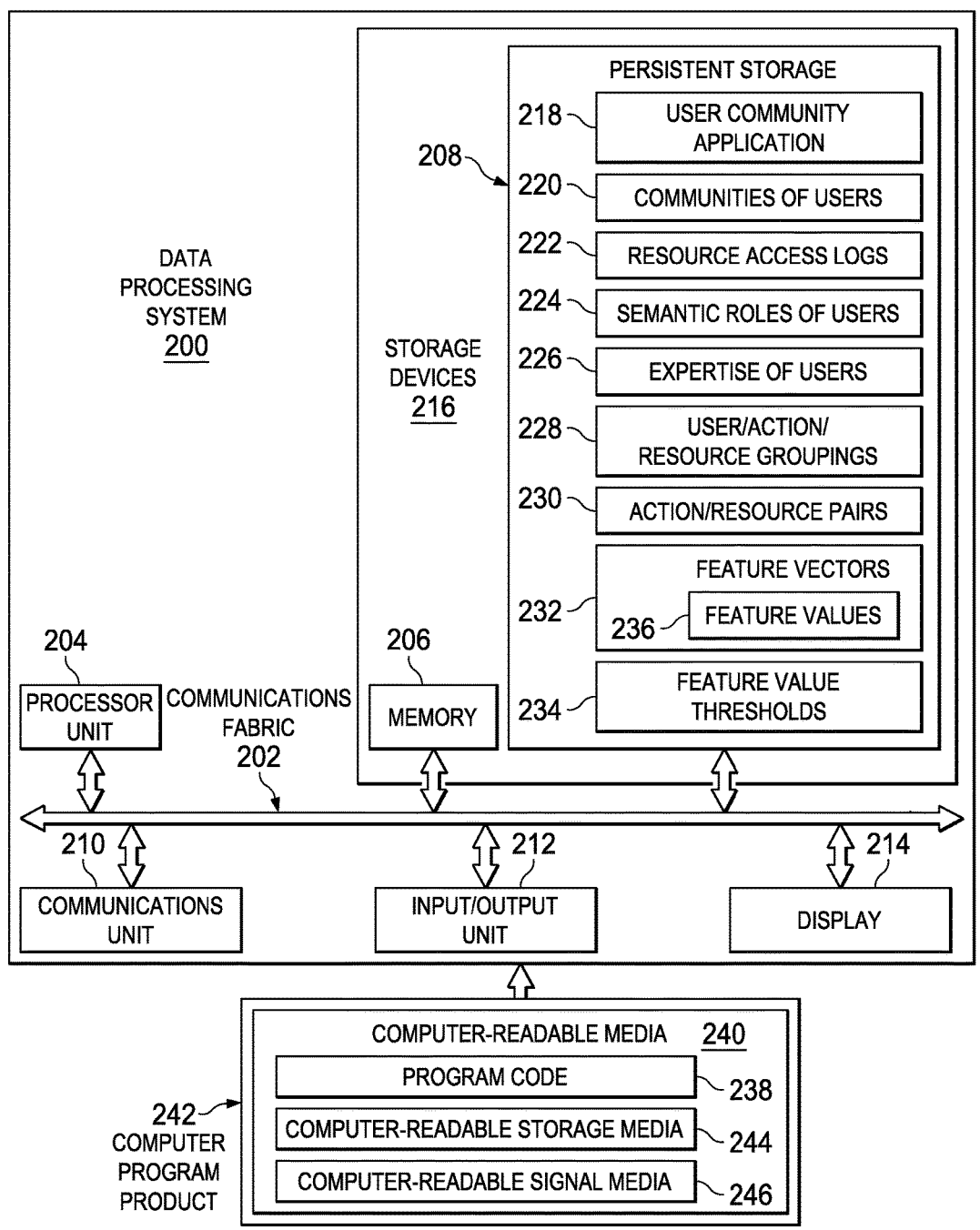
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other data processing devices in which the illustrative embodiments may be implemented. Network data processing system 100 contains network 102, which is the medium used to provide communications links between the computers and the other data processing devices connected together within network data processing system 100. Network 102 may include connections, such as wire communication links, wireless communication links, or fiber optic cables.

In the depicted example, server 104 and server 106 connect to network 102, along with storage 108. Server 104 and server 106 may be, for example, server computers with high-speed connections to network 102. In addition, server 104 and/or server 106 may provide services to client devices connected to network 102. For example, server 104 and/or server 106 may provide a service that generates different communities of users and discovers the expertise of the different communities of users by utilizing semantic analysis of resource access logs associated with resources accessed by the users. Also, server 104 and/or server 106 may monitor and/or control access to the resources connected to network 102.

Clients 110, 112, and 114 also connect to network 102. Clients 110, 112, and 114 are clients to server 104 and/or server 106. In the depicted example, server 104 and/or server 106 may provide information, such as boot files, operating system images, and applications to clients 110, 112, and 114. Users of clients 110, 112, and 114 utilize clients 110, 112, and 114 to access the services provided by server 104 and/or server 106.

Clients 110, 112, and 114 may be, for example, personal computers, network computers, and/or portable computers, such as laptop computers, with wire and/or wireless communication links to network 102. In addition, clients 110, 112, and 114 also may represent mobile data processing systems, such as cellular telephones, smart phones, personal digital assistants, gaming devices, or handheld computers, with wireless communication links to network 102. It should be noted that clients 110, 112, and 114 may represent any combination of computers and mobile data processing systems connected to network 102.

Resources 116 also connect to network 102. Resources 116 may be, for example, documents, software resources, such as applications and programs, hardware resources, such as processors and storage device, and/or network resources. The users of clients 110, 112, and 114 utilize clients 110, 112, and 114 to access resources 116. Resources 116 generate access logs 118. In other words, each resource in resources 116 generates its own access log. Alternatively, server 104 and/or server 106 may generate resource access logs 118 for resources 116 instead of or in addition to resources 116. Each access log associated with a particular resource records the name of the user that accessed the resource, the type of action performed by the user while accessing the particular resource, and the name of the particular resource accessed by the user. However, it should be noted that each access log in access logs 118 may record other information, such as, for example, date of access, time of access, role of user, security clearance level of user, permissions assigned to user, et cetera.

Storage 108 is a network storage device capable of storing data in a structured or unstructured format. Storage 108 may provide, for example, storage of: a plurality of different communities of users based on semantic analysis of resource access logs; a plurality of different resource access logs associated with a plurality of different resources; names and identification numbers of a plurality of different users; user profiles associated with each of the different users; and account information associated with each of the plurality of users. Furthermore, storage unit 108 may store other data, such as authentication or credential data that may include user names, passwords, and/or biometric data associated with each of the plurality of users and system administrators.

Also, it should be noted that network data processing system 100 may include any number of additional server devices, client devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of computer readable storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device does not include a propagation medium. Memory 206, in these examples, may be, for example, a random access memory, or any other suitable volatile or non-volatile storage device.

Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores user community application 218, communities of users 220, resource access logs 222, semantic roles of users 224, expertise of users 226, user/action/resource groupings 228, action/resource pairs 230, feature vectors 232, and feature value thresholds 234. However, it should be noted that persistent storage 208 may store any type of application, program, module, and data utilized by the different illustrative embodiments. User community application 218 is a software application that generates a plurality of different communities of users, such as communities of users 220, based on semantic analysis of access logs associated with resources accessed by the users via a network, such as network 102 in FIG. 1. The access logs associated with the resources accessed by the users may be, for example, resource access logs 222. In addition, user community application 218 also may discover the expertise of the users, such as expertise of users 226, within the different communities of users based on the semantic analysis of access logs.

Communities of users 220 represent a plurality of different groups of users. Each different community of users includes a set of two or more users with similar roles, expertise, and/or interests. The roles may be professional roles or personal roles. The professional roles may be, for example, associated with the type of work the users perform, the industry the users work in, or the employer the users work for. The personal roles may be, for example, associated with personal connections, such as family or friends, social events, hobbies, and/or entertainment interests.

Resource access logs 222 represent a plurality of different logs that record accesses to different resources by users. An access log within resource access logs 222 may record, for example, the name or identification (ID) of the user that accessed the resource, the type of action performed by the user while accessing the resource, and the name of the resource accessed by the user. The type of action may be, for example, a user performing a write operation within a document or a user inserting code within an application. Consequently, the name of the resource would be the name of the particular document that the user performed the write operation on or the name of the particular application that the user performed a code insert operation on.

Semantic roles of users 224 represent a plurality of different roles of the users. User community application 218 determines the different roles of the users by performing a semantic analysis of resource names expressed in natural language. Natural language is a human understandable language, such as English, and is not an artificial language, machine language, or a formal logic language, for example. Semantic analysis refers to the process of relating syntactic structures to their language-independent meanings.

Expertise of users 226 represents the expertise of the users within a particular community. Expertise consists of those characteristics, skills, and knowledge of an expert user that distinguish the expert from novices and less experienced users. User community application 218 determines expertise of users 226 based on the semantic analysis of the resource names expressed in natural language within resource access logs 222.

User/action/resource groupings 228 represent a plurality of different combinations of user identifications or names, action types, and resource names. A user/action/resource grouping includes the identification or name of a particular user that accessed a particular resource, the particular type of action performed by the particular user on the particular resource accessed by the user, and the name of the particular resourced accessed by the user. User community application 218 generates user/action/resource groupings 228 from resource access logs 222 that contain the user names, action types, and resource names.

Action/resource pairs 230 represent a plurality of action types and resource names, which are associated with each other. An action/resource pair is a user action performed on a resource combined with an associated resource name or resource name segment. User community application 218 generates action/resource pairs 230 by extracting the information from user/action/resource groupings 228.

Feature vectors 232 represent a plurality of feature vectors associated with a plurality of users. A feature vector is a vector representing each action/resource pair associated with a particular user as a feature within the feature vector. In other words, a feature vector for each user includes all the action/resource pairs associated with the plurality of users. Each column in a feature vector corresponds to each unique action/resource pair. Therefore, the feature vectors for the plurality of users are represented by the same set of action/resource pairs, but the feature values are different for each of the different users. User community application 218 generates feature vectors 232 using information extracted from user/action/resource groupings 228.

In addition, feature vectors 232 include feature values 236. Feature values 236 represent a plurality of numerical values that correspond to each action/resource pair within feature vectors 232. A feature value indicates how significant a particular feature (i.e., action/resource pair) is to a particular user. In a feature vector for a particular user, all action/resource pairs associated with the particular user receive a feature value greater than zero, while action/resource pairs not associated with the particular user receive a zero value. User community application 218 may generate each feature value based on, for example, a term frequency-inverse document frequency (TF-IDF) measurement for a particular action/resource pair that is contained within a feature vector associated with a particular user. For example, the feature value may be a count of the number of times the particular user executed a particular action/resource pair, which is recorded within the feature vector associated with that particular user.

Feature value thresholds 234 represent a set of one or more threshold values associated with the generated feature values corresponding to the action/resource pairs within each feature vector. User community application 218 uses feature value thresholds 234 to limit which action/resource pairs are included within a user matrix of all the users. In other words, user community application 218 only includes those action/resource pairs that have a feature value equal to or greater than feature value thresholds 234.

Communications unit 210, in this example, provides for communication with other data processing systems and computing devices. Communications unit 210 may provide communications through the use of either or both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user, such as system administrator.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206. These instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 238 is located in a functional form on computer readable media 240 that is selectively removable and may be loaded onto or transferred to data processing system 200 for running by processor unit 204. Program code 238 and computer readable media 240 form computer program product 242. In one example, computer readable media 240 may be computer readable storage media 244 or computer readable signal media 246. Computer readable storage media 244 may include, for example, an optical or magnetic disc that is inserted or placed into a drive or other device that is part of persistent storage 208 for transfer onto a storage device, such as a hard drive, that is part of persistent storage 208. Computer readable storage media 244 also may take the form of a persistent storage, such as a hard drive, a thumb drive, or a flash memory that is connected to data processing system 200. In some instances, computer readable storage media 244 may not be removable from data processing system 200.

Alternatively, program code 238 may be transferred to data processing system 200 using computer readable signal media 246. Computer readable signal media 246 may be, for example, a propagated data signal containing program code 238. For example, computer readable signal media 246 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 238 may be downloaded over a network to persistent storage 208 from another device or data processing system through computer readable signal media 246 for use within data processing system 200. For instance, program code stored in a computer readable storage media in a data processing system may be downloaded over a network from the data processing system to data processing system 200. The data processing system providing program code 238 may be a server computer, a client computer, or some other device capable of storing and transmitting program code 238.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 244 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that many efforts have been made to detect anomalous user behaviors by analyzing access logs of resources. Access logs provide information about who accessed which resources, when they accessed the resources, and what they did with the resources. However, this access log data has not previously been exploited for discovering underlying social networks among users, such as program developers within a collaboration network, for learning the semantic roles of different networks of users, or for determining experts among the users with regard to particular topics or types of tasks. By analyzing these access logs, illustrative embodiments are able to discover different sets of user groups whose accesses are correlated. Users that access the same set of resources may share similar job roles and belong to the same community. Illustrative embodiments may utilize, for example, text mining and topic modeling during analysis of the access logs.

Illustrative embodiments generate different communities of users, which represent semantic roles of the users within a particular community, based on the names of the resources accessed by the users within a community, the types of resources accessed by the users, and the actions performed by the users on the accessed resources. Illustrative embodiments treat the actions recorded in the access logs as verbs in human language and the resources as the objects. Thus, illustrative embodiments transform user names, actions taken, and resources accessed into subject-verb-object constructs in natural language. Illustrative embodiments then group the users based on similarity of their associated verb-object (i.e., action/resource pair) constructs. A community of users generated in this way denotes that the users perform similar tasks and that the users perform a similar set of permissions, which is similar to role mining. By analyzing the verb (i.e., action) and the object (i.e., resource) together, illustrative embodiments are able to determine the roles of the subjects (i.e., users) based on the actions the subjects take on the objects. For example, if an object resource is an apple, then a subject user who plants, grows, and picks the object resource apple and a different subject user who buys and eats the object resource apple are determined to have different roles and, therefore, are determined to belong to different communities of users. The former subject user may be a fruit grower and the latter subject user may be a consumer.

In addition, illustrative embodiments also determine that in certain access logs, the resource names are represented in textual formats, such as file names and uniform resource locators (URLs). When the textual names of resources are available, illustrative embodiments automatically label the discovered communities of users with meaningful descriptions (e.g., "cluster labeling") and discover the expertise of the users (e.g., java experts or computer security experts) by applying text mining and topic modeling techniques. For example, file names are typically composed of a series of words denoting the path names to the specific file (e.g., "/src/company/security/"). These resource names contain words that denote the topics of the project. Furthermore, many file extensions (e.g., .java, .c, .xml, and .pdf) also indicate the areas of interest or specialties of the users accessing such a resource. For example, if a user, such as a program developer, frequently accesses java programs rather than C programs, then illustrative embodiments may determine that the user has expertise in java programming.

While these file names do not provide details as to the content of the file, these file names do provide an approximation as to the content and are more practical in many situations where data privacy and security concerns prohibit divulging the content of the file inadvertently. The discovery of such latent roles through the names and grouping of resources serves to identify the expertise or interests of the different communities of users. Illustrative embodiments by discovering different communities of users and experts provide useful information to various applications, such as, for example, recommender systems, expert finder systems, anomaly detection systems, and role-based access control systems, associated with different resources.

Illustrative embodiments may utilize the following steps to discover and generate different communities of users and determine the roles of users within a particular community. First, illustrative embodiments extract all user/action/resource (i.e., subject-verb-object) groupings from retrieved resource access logs. If textual names of the accessed resources are not available, illustrative embodiments treat each resource as a distinct object. Then, illustrative embodiments collect all unique action/resource pairs (i.e., verb-object pairs) from the extracted user/action/resource groupings.

Afterward, illustrative embodiments generate a set of all unique action/resource pairs associated with all users. Illustrative embodiments then generate a feature vector for each user (i.e., subject), treating each unique action/resource pair associated with a particular user as a feature within the feature vector. Subsequently, illustrative embodiments calculate a feature value for each action/resource pair feature associated with the particular user within the feature vector. The calculated feature value is a weight of a particular action/resource pair for the user. Illustrative embodiments may calculate the feature value by applying, for example, a term frequency—inverse document frequency (TF-IDF) measure, which is used in information retrieval as the weight. The term frequency—inverse document frequency measure indicates how relevant a action/resource pair is to a user. Illustrative embodiments may calculate the feature value as follows:

TF(V-O, S) The term frequency of a particular action/resource pair associated with a particular user is equal to the number of access logs that record the particular user performing the particular action on the particular resource.

IDF(V-O)=log(N/DF(V-O)) The inverse document frequency of the particular action/resource pair is equal to the log of the number of all user/action/resource groupings within the access logs (N) divided by the number of unique users that performed the particular action on the particular resource (DF(V-O)).

The reason illustrative embodiments weight action/resource pairs by the inverse document frequency of action/resource pairs is the same as that for information retrieval systems. Raw term frequency suffers from a critical problem: all terms are considered equally important, but certain terms have little or no discriminating power in determining relevance. For example, many source code file names have common terms, such as "src" and "project" in the file names, which yields a higher term frequency. However, these common terms are not a good feature for discovering communities of users or specialties of users since most of the file names contain these common terms. Inverse document frequency reduces the effect of these common terms that occur often in a collection of file names.

After representing each user as a vector of term frequency—inverse document frequency, illustrative embodiments apply various analytics to discover the different communities of users. Some example analytics may include applying a clustering algorithm or a generative topic modeling algorithm, such as, for example, Latent Dirichlet Allocation (LDA), to discover the different underlying communities of users. Also, illustrative embodiments may discover the network structure among the users within a community by applying graph mining algorithms. For example, illustrative embodiments may generate a model of a community of users based on the determined expertise of the users within the community, user roles associated with the community, and/or attributes of users within the community.

Further, when textual names of resources are available in natural language, illustrative embodiments perform a finer-grained analysis to learn the semantic meaning of the discovered communities of users and the expertise of the users within the different communities. First, illustrative embodiments segment resource names and obtain a set of resource name segments or words. Illustrative embodiments may perform a segmentation by breaking resource names at non-alphanumeric symbols, such as "/","\", "-", ".". In addition, illustrative embodiments may segment a resource name by breaking up a word that includes a capital letter in the middle of the word. For example, illustrative embodiments may segment "MainTest" into "Main" and "Test" resource name segments.

Illustrative embodiments may then normalize the words by removing stop words (i.e., commonly used words with no meaning), such as "of", "to", et cetera, and all numeric words, such as, for example, 2013, and by lower-casing the words. Subsequently, illustrative embodiments may generate action/resource pairs, where the action is the particular type of action performed by a user on the particular resource and the resource name is each name segment instead of the entire resource name. For example, if the type of action performed by the user is "FileCheckIn" and the resource name is "ExpectedResults.txt", then illustrative embodiments may generate three action/resource pairs associated with the user: 1) "FileCheckIn/expected"; 2) "FileCheckIn/results"; and 3) "FileCheckIn/txt". Afterward, illustrative embodiments generate a feature vector for each user based on the generated action/resource pairs associated with a particular user.

Once illustrative embodiments generate the feature vectors for each of the users, illustrative embodiments apply an algorithm, such as, for example, a clustering algorithm, a graph mining algorithm, or a generative topic modeling algorithm, to discover the different underlying communities of users. Further, illustrative embodiments label the different communities of users with, for example, the top "n" number of resource names. Furthermore, illustrative embodiments may label each individual user within a community with, for example, the top "m" number of most relevant action/resource pairs associated with the community. It should be noted that both "n" and "m" represent a predetermined number, which may be the same number or different numbers.

The set of communities to which a user belongs may be seen as analogous to the roles the user plays within an organization or company. That is, the community dictates the permissions the user has to perform tasks or duties assigned to the user. For example, illustrative embodiments define a role that provides users of a particular community with the necessary permissions or rights to access the resources associated with that particular community of users. As a result, computer security systems may utilize different illustrative embodiments as a role mining method. Typically, role mining is the process of creating roles and then assigning users to the roles and roles to permissions by analyzing user-to-permission (i.e., accessed resources) mapping data. However, illustrative embodiments generate fine-grain and semantically coherent sets of user groups by taking into account individual resources and providing semantic labels that represent the roles or the expertise of a particular community or a particular user.

Using the communities of users determined from resource access logs, illustrative embodiments may define a security policy to restrict a particular user's access to certain resources. Illustrative embodiments may define a role-based access control policy based on the resource access patterns of users within a particular community. For example, illustrative embodiments may assign a set of resources to a particular community based on a pattern of resource names (i.e., resource name patterns) specified by prior resource accesses by users of that particular community. A resource name pattern may be, for example, "program A.java", "program B.java", and "program C.java". Illustrative embodiments may assign this set of resources with a similar resource name pattern to the particular community of users that accessed these resources previously. Further, illustrative embodiments may refine the set of resources assigned to that particular community based on the order of names within file names. For example, illustrative embodiments will not treat "program A.java" and "java.program A" as equivalent file names. In other words, program A.java and java.program A are not matching file names.

Illustrative embodiments may weight resource accesses based on the importance of the resource to the definition of a particular community and the likelihood of the particular user's membership within the community that wants to access the resource. A security policy must be a binary decision, such as, for example, "allow" or "deny", and cannot return a likelihood of a user's membership within a community that wants to access the resource. Any resource whose significance to a particular community of users is below a predetermined threshold, illustrative embodiments remove that resource from the role definition derived for that community. In addition, illustrative embodiments only assign those users to the role derived for that community whose likelihood of being a member of that community is greater than a predetermined threshold. Illustrative embodiments may dynamically derive these thresholds to reduce the risk of granting too much access to certain users (e.g., granting a user access to a resource that the user has never accessed before).

Illustrative embodiments may define the resources assigned to a particular community as the union of the resources accessed by members of that community. In addition, illustrative embodiments may abstract the attributes describing the resources accessed by the members of the community, such that illustrative embodiments also may assign similar resources to the community. Illustrative embodiments may utilize a supervised machine learning program, such as a one-class classifier model or a two-class classifier model, to abstract the attributes of the resources and assign similar resources to the community. For example, illustrative embodiments may assign any similar resource to the role in the derived security policy of the community that satisfies the classifier model with a likelihood of being included in a particular group of resources equal to or greater than a predetermined threshold value.

If resources are organized hierarchically, such as in a path of a file system or a path of a uniform resource identifier (URI) system, illustrative embodiments may assign a role derived from a community of users to all resources in sub-branches of a particular path, such that all resources in the sub-branches are members of the community having a likelihood of being included in the particular group of resources equal to or greater than a predetermined threshold value. Further, illustrative embodiments may abstract the attributes of the users or resources, such that illustrative embodiments may define an attribute-based filter. Illustrative embodiments may utilize a decision tree to define conjunction and disjunction rules over the abstracted user and resource attributes, as defined by the community, to define Boolean rules to allow or deny resource access.

As illustrative embodiments add a new resource or user to the system, illustrative embodiments add the new resource or user to the correct security roles based on the community that the new resource or user most closely represents. The set of communities that a particular user may be a member of may be thought of as part of a user profile associated with that particular user. As described above, illustrative embodiments are able to identify the set of communities that a user's actions place the user within based on an associated likelihood that the user is included in the set of communities. Thus, at any given time, illustrative embodiments may label this set of communities and the associated likelihood as part of the current user profile associated with that particular user. Illustrative embodiments may utilize this portion of the user's profile for anomaly detection. For example, illustrative embodiments may send an alert message to a system administrator when the set of communities associated with that particular user changes significantly or changes in a security relevant manner.

Illustrative embodiments may first profile the user's communities during a training time period to discover which different communities the user may participate in during this training time period. During a test time period, illustrative embodiments may similarly discover the set of communities that the user participates in. Illustrative embodiments may then compare the set of communities discovered in the test time period with the set of communities discovered in the training time period using one of many statistical comparison methods. For example, illustrative embodiments may compare the root mean square error (RMSE) between the two sets of communities. If this comparison produces a comparison value that exceeds a predetermined threshold value, illustrative embodiments may send an alert message to a system administrator indicating that the user's behavior has changed significantly as represented by the communities that the user participates in.

In addition, illustrative embodiments may utilize other methods to send alerts when the user's set of communities suddenly changes. For example, illustrative embodiments may continuously track the set of communities that a user belongs to and sent an alert when the set of communities changes over two consecutive predetermined time periods. This method allows for small, gradual changes in the set of communities associated with the user, but sends an alert when there is a sudden significant change, which may be advantageous to the method of comparing against a profile built during a training time period.

Further, illustrative embodiments also may mark certain communities of users with a security critical label, such as, for example, a community that performs write operations or actions on .c or .java files. For example, illustrative embodiments may assign a sensitivity level (e.g., security critical label) to a community based on other labels associated with the community. Given a set of communities that illustrative embodiments label as security critical, illustrative embodiments may send an alert whenever a user, which does not normally participate in one of these security critical communities, suddenly transitions to a security critical community. This method tolerates changes to a user's set of communities as long as the user does not transition into a security critical community.

In addition, illustrative embodiments may correlate the attributes of users that are members of the same community to detect users whose attributes are different from other users within that same community. Illustrative embodiments may then utilize this difference in user attributes within the same community to send alerts. Comparing attributes of users requires the definition of a distance function between the attributes of the different users. This may depend on the type and values of the user attributes. For example, it is straightforward to define the distance function with regard to Boolean attributes. However, it is more complex to define the distance function for attributes such as "department" and may depend on the organization with which the department is associated.

Illustrative embodiments assume that a set of security relevant attributes exists for users within a community and that each of these security relevant attributes has an appropriately defined distance function. Using these distance functions, illustrative embodiments can cluster users by their associated attributes. Furthermore, illustrative embodiments can identify users who are within the same community, but whose attributes are sufficiently far from the other users within the community (i.e., attributes having a distance function that exceeds a predetermined distance threshold value for a particular community). As a result, illustrative embodiments are able to send an alert message to a system administrator regarding a user having attributes that exceed the predetermined distance threshold.

Thus, illustrative embodiments provide a computer-implemented method, computer system, and computer program product for automatically discovering communities and enterprise social networks of professionals (i.e., groups of users or people with similar interests or job roles) by semantically analyzing the access logs of resources, such as application logs for file repositories, web applications, or system accesses. Furthermore, the illustrative embodiments may utilize these discovered communities of users for computer security, such as user profiling, anomaly detection, and security policy generation.

Figure 3:
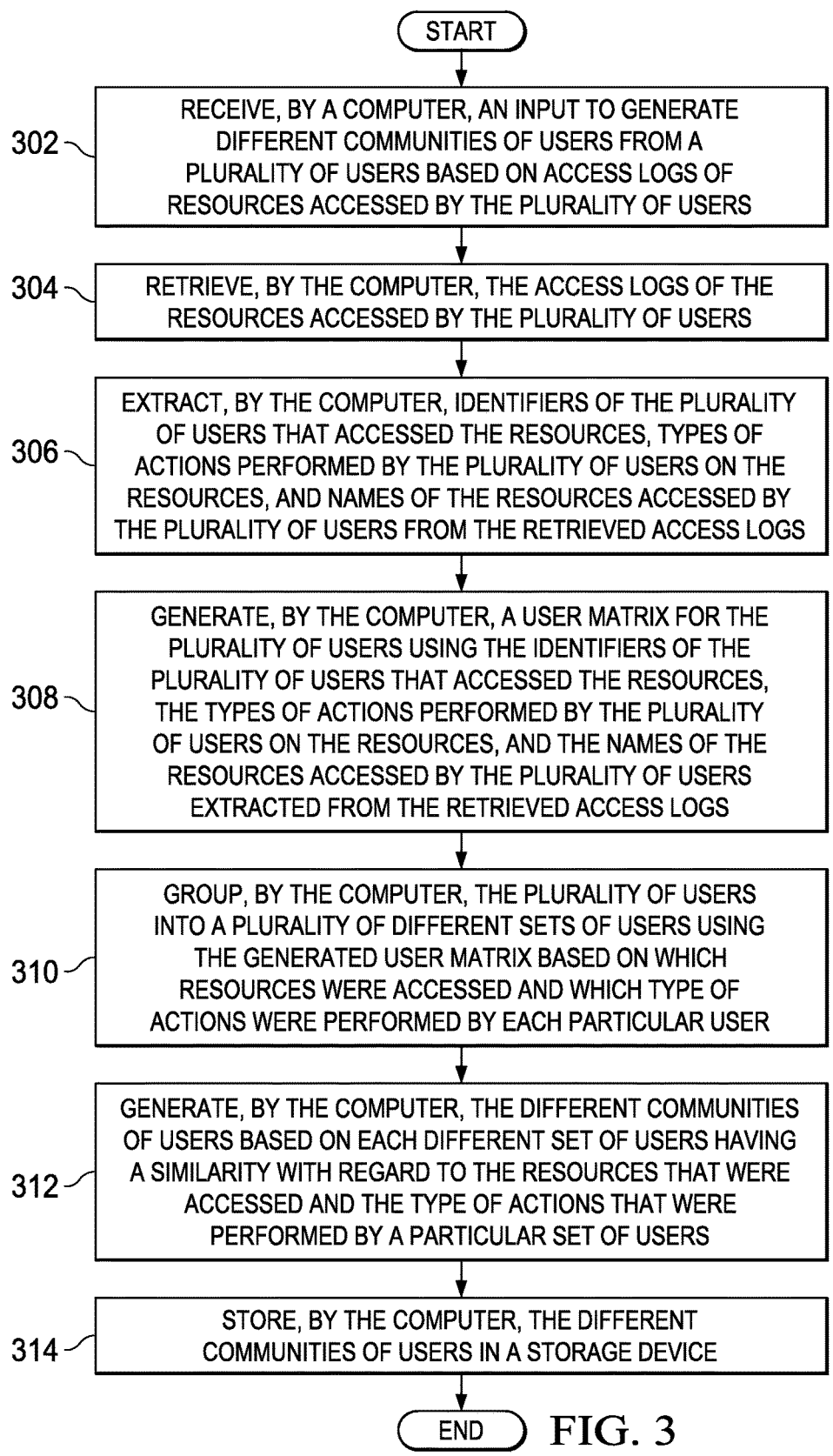
FIG. 3 is a flowchart illustrating a process for generating communities of users based on resource access logs in accordance with an illustrative embodiment.

With reference now to FIG. 3, a flowchart illustrating a process for generating communities of users based on resource access logs is shown in accordance with an illustrative embodiment. The process shown in FIG. 3 may be implemented in a computer, such as, for example, data processing system 200 in FIG. 2.

The process begins when the computer receives an input to generate different communities of users from a plurality of users based on access logs of resources accessed by the plurality of users (step 302). The computer retrieves the access logs of the resources accessed by the plurality of users (step 304). The computer then extracts identifications of the plurality of users that accessed the resources, types of actions performed by the plurality of users on the resources, and names of the resources accessed by the plurality of users from the retrieved access logs (step 306). Alternatively, the computer may extract the names of the plurality of users.

Afterward, the computer generates a user matrix for the plurality of users using the identifications of the plurality of users that accessed the resources, the types of actions performed by the plurality of users on the resources, and the names of the resources accessed by the plurality of users extracted from the retrieved access logs (step 308). In addition, the computer groups the plurality of users into a plurality of different sets of users using the generated user matrix based on which resources were accessed and which type of actions were performed by each particular user (step 310).

Subsequently, the computer generates the different communities of users based on each different set of users having a similarity with regard to the resources that were accessed and the types of actions that were performed by a particular set of users (step 312). The computer stores the different communities of users in a storage device (step 314). Thereafter, the process terminates.

Figure 4:
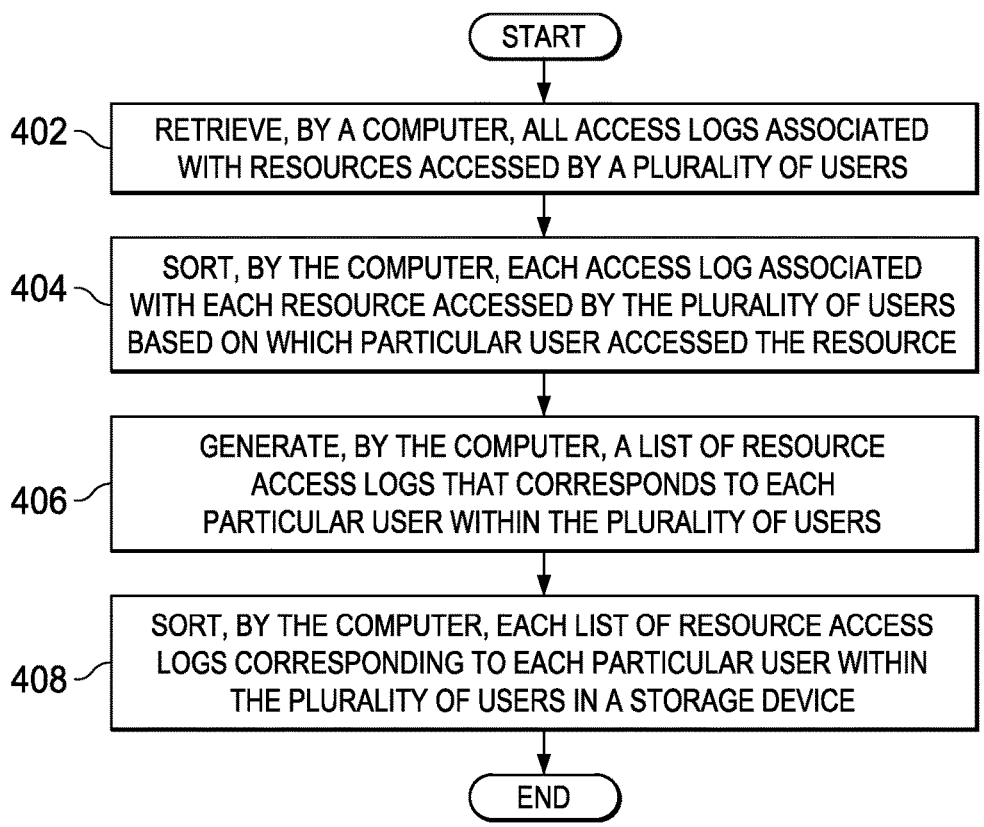
FIG. 4 is a flowchart illustrating a process for generating lists of resource access logs in accordance with an illustrative embodiment.

With reference now to FIG. 4, a flowchart illustrating a process for generating lists of resource access logs is shown in accordance with an illustrative embodiment. The process shown in FIG. 4 may be implemented in a computer, such as, for example, data processing system 200 in FIG. 2.

The process begins when the computer retrieves all access logs associated with resources accessed by a plurality of users (step 402). The computer sorts each access log associated with each resource accessed by the plurality of users based on which particular user accessed the resource (step 404). The computer then generates a list of resource access logs that corresponds to each particular user within the plurality of users (step 406). The computer stores each list of resource access logs corresponding to each particular user within the plurality of users in a storage device (step 408). Thereafter, the process terminates.

With reference now to FIG. 5, a flowchart illustrating a process for generating user/action/resource groupings based on information extracted from resource access logs is shown in accordance with an illustrative embodiment. The process shown in FIG. 5 may be implemented in a computer, such as, for example, data processing system 200 in FIG. 2.

The process begins when the computer retrieves all lists of resource access logs corresponding to a plurality of users from a storage device (step 502). The computer selects a list of resource access logs that corresponds to a particular user within the plurality of users (step 504). The computer then selects a resource access log within the selected list of resource access logs that corresponds to the particular user (step 506).

Afterward, the computer extracts an identification of the particular user, a type of action performed by the particular user on a particular resource, and a name of the particular resource accessed by the particular user from the selected resource access log (step 508). Subsequently, the computer, using information extracted from the selected resource access log, generates a user/action/resource grouping based on the identification of the particular user, the type of action performed by the particular user on the particular resource, and the name of the particular resource accessed by the particular user (step 510). The computer stores the user/action/resource grouping in a storage device (step 512).

Then, the computer makes a determination as to whether another resource access log exists within the selected list of resource access logs that corresponds to the particular user (step 514). If the computer determines that another resource access log does exist within the selected list of resource access logs that corresponds to the particular user, yes output of step 514, then the process returns to step 506 where the computer selects another resource access log within the selected list of resource access logs. If the computer determines that another resource access log does not exist within the selected list of resource access logs that corresponds to the particular user, no output of step 514, then the computer makes a determination as to whether another list of resource access logs that corresponds to another user within the plurality of users exists (step 516). If the computer determines that another list of resource access logs that corresponds to another user within the plurality of users does exist, yes output of step 516, then the process returns to step 504 where the computer selects another list of resource access logs that corresponds to another user. If the computer determines that another list of resource access logs that corresponds to another user within the plurality of users does not exist, no output of step 516, then the process terminates thereafter.

Figure 6A:
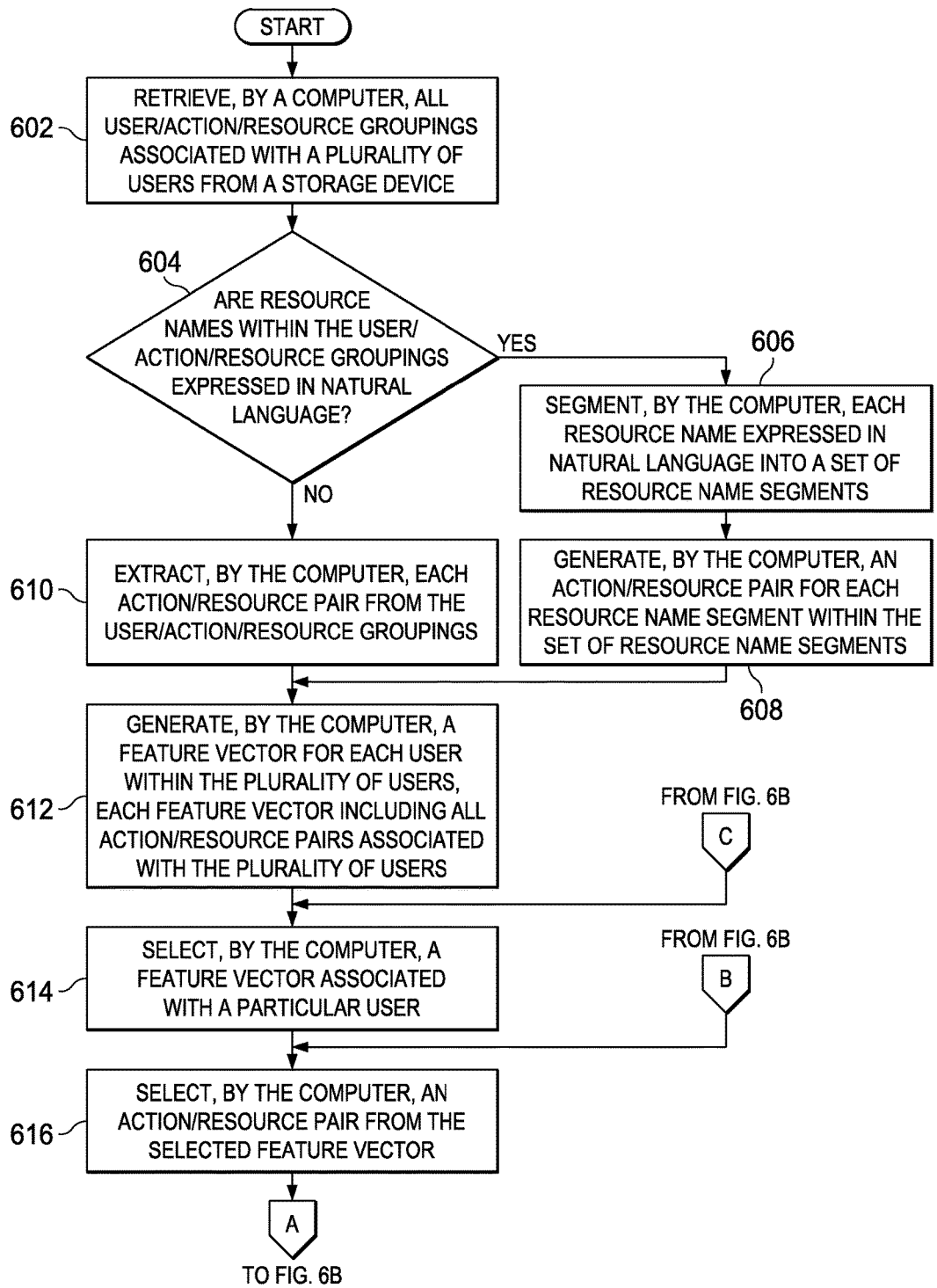
FIGS. 6A-6B are a flowchart illustrating a process for generating a user matrix in accordance with an illustrative embodiment.
Figure 6B:
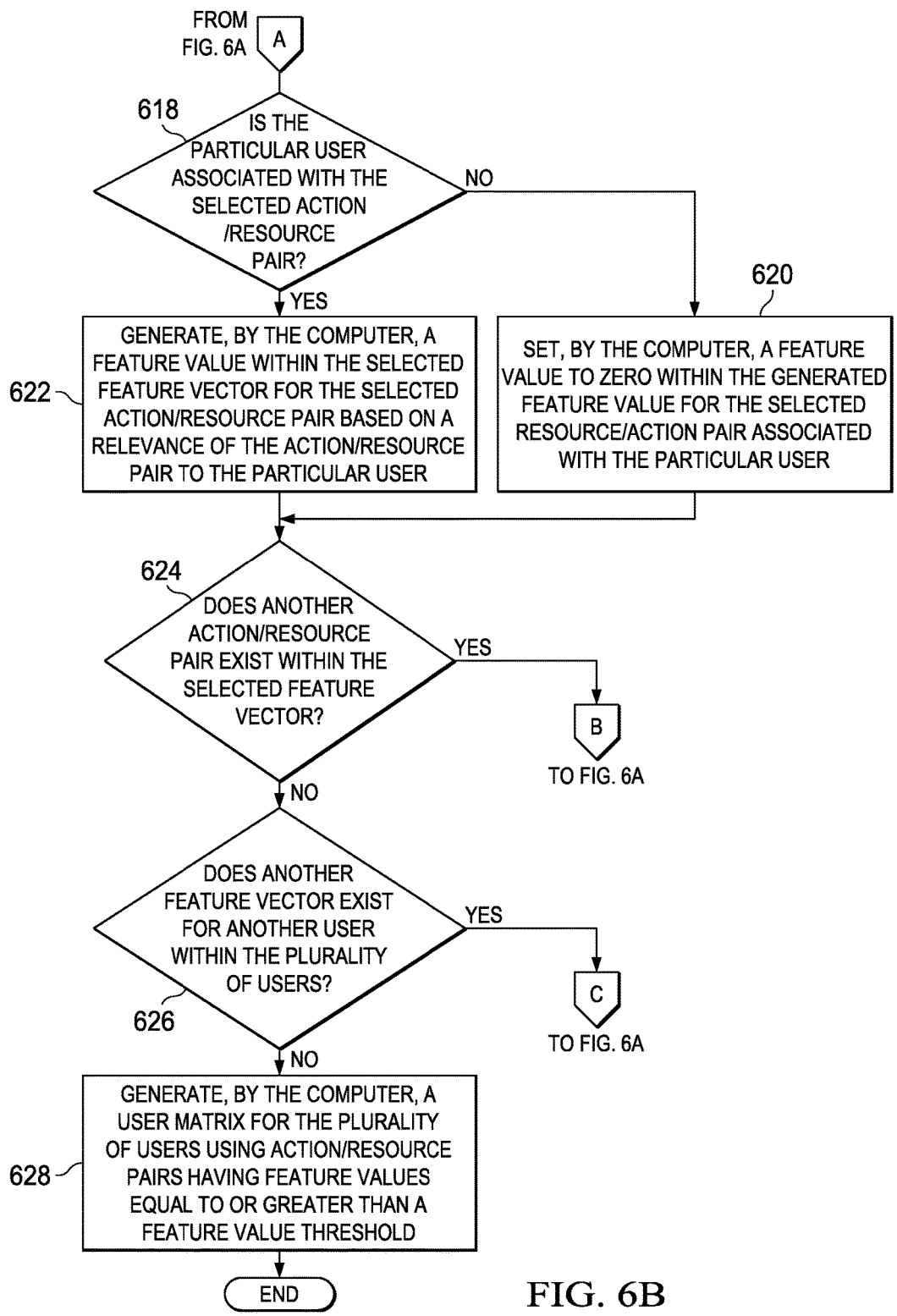

With reference now to FIGS. 6A-6B, a flowchart illustrating a process for generating a user matrix is shown in accordance with an illustrative embodiment. The process shown in FIGS. 6A-6B may be implemented in a computer, such as, for example, data processing system 200 in FIG. 2.

The process begins when the computer retrieves all user/action/resource groupings associated with a plurality of users from a storage device (step 602). Afterward, the computer makes a determination as to whether resource names within the user/action/resource groupings are expressed in natural language (step 604). If the computer determines that the resource names within the user/action/resource groupings are expressed in natural language, yes output of step 604, then the computer segments each resource name expressed in natural language into a set of resource name segments (step 606). In addition, the computer generates an action/resource pair for each resource name segment within the set of resource name segments (step 608). Thereafter, the process proceeds to step 612.

Returning again to step 604, if the computer determines that the resource names within the user/action/resource groupings are not expressed in natural language, no output of step 604, then the computer extracts each action/resource pair from the user/action/resource groupings (step 610). Subsequently, the computer generates a feature vector for each user within the plurality of users, each feature vector including all action/resource pairs associated with the plurality of users (step 612). Afterward, the computer selects a feature vector associated with a particular user (step 614). In addition, the computer selects an action/resource pair from the selected feature vector (step 616).

Then, the computer makes a determination as to whether the particular user is associated with the selected action/resource pair (step 618). If the computer determines that the particular user is not associated with the selected action/resource pair, no output of step 618, then the computer sets a feature value to zero within the selected feature vector for the selected action/resource pair (step 620). Thereafter, the process proceeds to step 624.

Returning again to step 618, if the computer determines that the particular user is associated with the selected action/resource pair, yes output of step 618, then the computer generates a feature value within the selected feature vector for the selected action/resource pair based on a relevance of the action/resource pair to the particular user (step 622). The computer may determine the relevance the action/resource pair using, for example, a term frequency-inverse document frequency calculation. Afterward, the computer makes a determination as to whether another action/resource pair exists within the selected feature vector (step 624). If the computer determines that another action/resource pair does exist within the selected feature vector, yes output of step 624, then the process returns to step 616 where the computer selects another action/resource pair from the selected feature vector. If the computer determines that another action/resource pair does not exist within the selected feature vector, no output of step 624, then the computer makes a determination as to whether another feature vector exists for another user within the plurality of users (step 626).

If the computer determines that another feature vector does exist for another user within the plurality of users, yes output of step 626, then the process returns to step 614 where the computer selects another feature vector associated with another user. If the computer determines that another feature vector does not exist for another user within the plurality of users, no output of step 626, then the computer generates a user matrix for the plurality of users using action/resource pairs having feature values equal to or greater than a feature value threshold (step 628). Thereafter, the process terminates.

Figure 7:
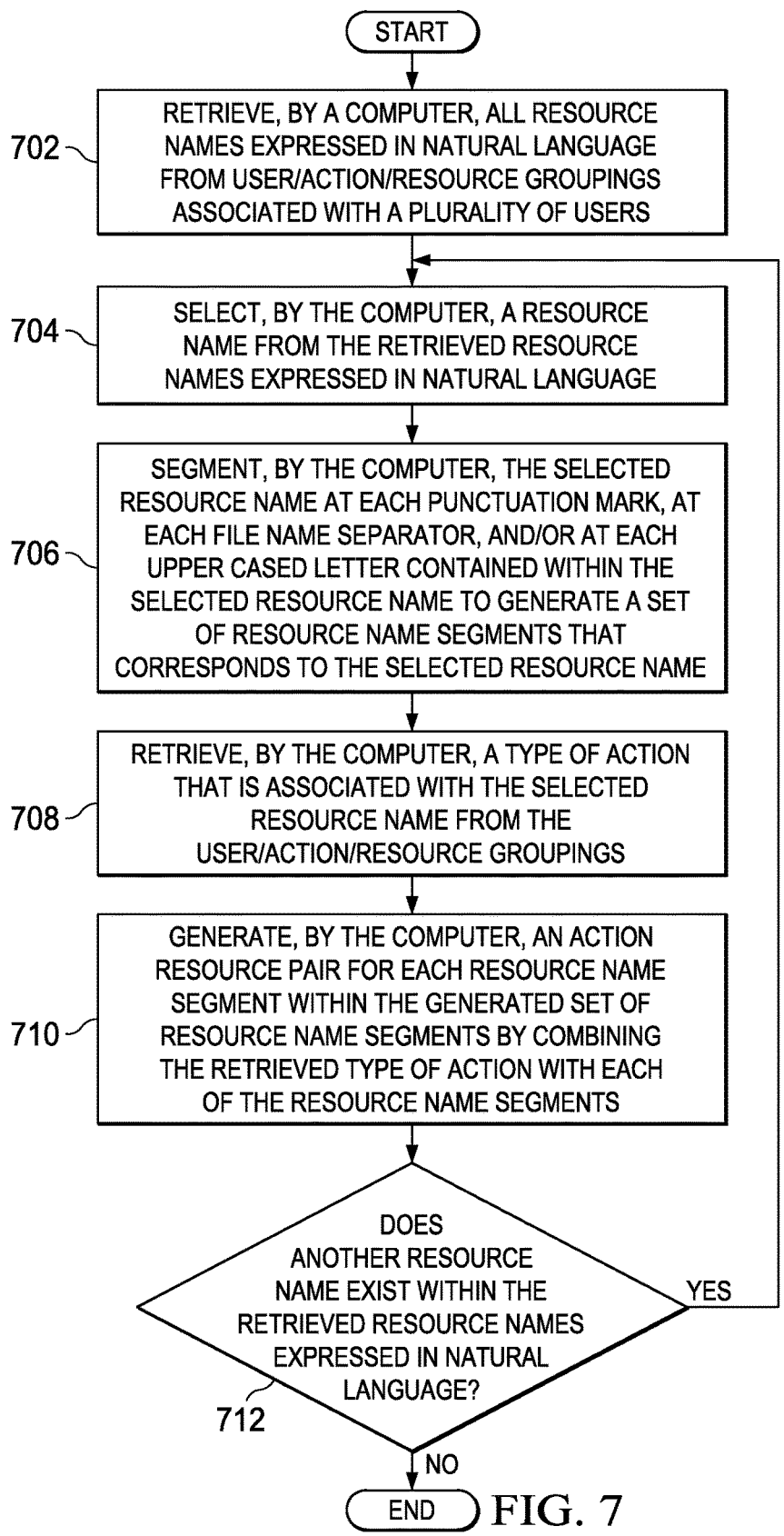
FIG. 7 is a flowchart illustrating a process for generating action/resource pairs based on segmented resource names in accordance with an illustrative embodiment.

With reference now to FIG. 7, a flowchart illustrating a process for generating action/resource pairs based on segmented resource names is shown in accordance with an illustrative embodiment. The process shown in FIG. 7 may be implemented in a computer, such as, for example, data processing system 200 in FIG. 2.

The process begins when the computer retrieve all resource names expressed in natural language from user/action/resource groupings associated with a plurality of users (step 702). The computer selects a resource name from the retrieved resource names expressed in natural language (step 704). In addition, the computer segments the selected resource name at each punctuation mark, at each file name separator, and/or at each upper cased letter contained within the selected resource name to generate a set of resource name segments that corresponds to the selected resource name (step 706).

Afterward, the computer retrieves a type of action that is associated with the selected resource name from the user/action/resource groupings (step 708). Then, the computer generates an action/resource pair for each resource name segment within the generated set of resource name segments by combining the retrieved type of action with each of the resource name segments (step 710). Subsequently, the computer makes a determination as to whether another resource name exists within the retrieved resource names expressed in natural language (step 712). If the computer determines that another resource name does exist within the retrieved resource names expressed in natural language, yes output of step 712, then the process returns to step 704 where the computer selects another resource name from the retrieved resource names. If the computer determines that another resource name does not exist within the retrieved resource names expressed in natural language, no output of step 712, then the process terminates thereafter.

Thus, illustrative embodiments provide a computer-implemented method, computer system, and computer program product for discovering communities of users accessing resources via a network and discovering the expertise of the users by utilizing semantic analysis of access logs associated with the resources accessed by the users. The descriptions of the various illustrative embodiments have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of computer systems, computer-implemented methods, and computer program products according to various illustrative embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for generating communities of users, the computer-implemented method comprising:

extracting, by a computer, identifications of a plurality of users that accessed resources via a network, types of actions performed by the plurality of users on the resources, and names of the resources accessed by the plurality of users from retrieved resource access logs;

grouping, by the computer, the plurality of users into a plurality of different sets of users based on which resources were accessed and which type of actions were performed by each particular user within the plurality of users;

generating, by the computer, the communities of users based on each different set of users having a similarity with regard to the resources that were accessed and the types of actions that were performed by a particular set of users;

generating, by the computer, a user matrix for the plurality of users that accessed the resources using the types of actions performed by the plurality of users on the resources and the names of the resources accessed by the plurality of users extracted from the retrieved resource access logs;

generating, by the computer, a row in the user matrix for a particular user as a feature vector for the particular user, wherein the feature vector includes all action/resource pairs associated with the particular user within the plurality of users;

generating, by the computer, the feature value within the feature vector for an action/resource pair associated with the particular user equal to the number of access logs that record the particular user performing the particular action on the particular resource and to the log of the number of all user/action/resource groupings within the access logs divided by the number of unique users that performed the particular action on the particular resource;

generating, by the computer, using information extracted from a retrieved resource access log, a user/action/resource grouping based on an identifier of a particular user, a type of action performed by the particular user on a particular resource, and the name of the particular resource accessed by the particular user;

retrieving, by the computer, the type of action performed by the particular user on the particular resource from the user/action/resource grouping; and displaying, by the computer, the user matrix with only those action/resource pairs that do not exceed a threshold for the feature value.

2. The computer-implemented method of claim 1, further comprising:

labeling, by the computer, each community of users with labels that represent one of roles or expertise of users assigned to a particular community.

3. The computer-implemented method of claim 2, wherein the computer determines at least one of most relevant resource names and action types for each community of users to label different communities of users.

4. The computer-implemented method of claim 1, further comprising:

responsive to the computer determining that the name of the particular resource within the user/action/resource grouping is expressed in natural language, segmenting, by the computer, the name of the particular resource at, at least one of, each punctuation mark, each file name separator, and each upper cased letter contained within the name of the particular resource to generate a set of resource name segments that corresponds to the particular resource generating, by the computer, an action/resource pair for each resource name segment within the set of resource name segments by combining the retrieved type of action performed by the particular user on the particular resource with each of the resource name segments.

5. The computer-implemented method of claim 1, further comprising:

generating, by the computer, a feature set for the plurality of users from retrieved resource access logs corresponding to all pairs of types of actions performed by the plurality of users and names of resources accessed by the plurality of users by performing a particular action.

6. The computer-implemented method of claim 1, wherein the computer utilizes one of a clustering algorithm or a topic modeling algorithm over the user matrix to determine roles, expertise, and attributes of users associated with a particular community of users, and wherein the computer generates a model of the particular community of users based on the roles, expertise, and attributes of the users associated with the particular community of users.

7. The computer-implemented method of claim 6, wherein the computer assigns users to a community based on the attributes of the users.

8. The computer-implemented method of claim 1, wherein the computer defines a role that provides members of a particular community of users with permissions to access resources associated with that particular community of users.

9. The computer-implemented method of claim 1, wherein the computer assigns a set of resources to a particular community of users based on members of that particular community of users previously accessing the set of resources.

10. The computer-implemented method of claim 1, wherein the computer assigns a set of resources to a particular community of users based on resource name patterns specified by members of that particular community of users during prior accesses to the set of resources.

11. The computer-implemented method of claim 10, wherein the computer assigns the set of resources to the particular community of users based on order of names within the resource name patterns.

12. The computer-implemented method of claim 1, wherein the computer assigns a role derived from a community of users to all resources in sub-branches of a particular file path, wherein all resources in the sub-branches are assigned to the community having a likelihood of being included in a particular group of resources equal to or greater than a predetermined threshold value.

13. The computer-implemented method of claim 1, wherein the computer assigns a sensitivity level to a particular community of users based on labels associated with the particular community of users.

14. The computer-implemented method of claim 1, wherein the computer sends an alert message in response to a particular user transitioning from a lower sensitivity level community of users to a higher sensitivity level community of users that the particular user did not previously participate in.

15. A computer system for generating communities of users, the computer system comprising:

a bus system;

a storage device connected to the bus system, wherein the storage device stores computer readable program code; and a processor unit connected to the bus system, wherein the processor unit executes the computer readable program code to extract identifications of a plurality of users that accessed resources via a network, types of actions performed by the plurality of users on the resources, and names of the resources accessed by the plurality of users from retrieved resource access logs; group the plurality of users into a plurality of different sets of users based on which resources were accessed and which type of actions were performed by each particular user within the plurality of users; and generate the communities of users based on each different set of users having a similarity with regard to the resources that were accessed and the types of actions that were performed by a particular set of users;

the processor unit further executes computer readable code to generate a user matrix for the plurality of users that accessed the resources using the types of actions performed by the plurality of users on the resources and the names of the resources accessed by the plurality of users extracted from the retrieved resource access logs; to generate a row in the user matrix for a particular user as a feature vector for the particular user, wherein the feature vector includes all action/resource pairs associated with the particular user within the plurality of users; to generate a feature value within the feature vector for an action/resource pair associated with the particular user equal to the number of access logs that record the particular user performing the particular action on the particular resource and to the log of the number of all user/action/resource groupings within the access logs divided by the number of unique users that performed the particular action on the particular resource; to generate, using information extracted from a retrieved resource access log, a user/action/resource grouping based on an identifier of a particular user, a type of action performed by the particular user on a particular resource, and the name of the particular resource accessed by the particular user; to retrieve the type of action performed by the particular user on the particular resource from the user/action/resource grouping; and to display the user matrix with only those action/resource pairs that do not exceed a threshold for the feature value.

16. A computer program product stored on a non-transitory computer readable storage medium having computer readable program code encoded thereon that is executable by a computer for generating communities of users, the computer program product comprising:

computer readable program code to extract identifications of a plurality of users that accessed resources via a network, types of actions performed by the plurality of users on the resources, and names of the resources accessed by the plurality of users from retrieved resource access logs;

computer readable program code to group the plurality of users into a plurality of different sets of users based on which resources were accessed and which type of actions were performed by each particular user within the plurality of users;

computer readable program code to generate the communities of users based on each different set of users having a similarity with regard to the resources that were accessed and the types of actions that were performed by a particular set of users;

computer readable program code to generate a user matrix for the plurality of users that accessed the resources using the types of actions performed by the plurality of users on the resources and the names of the resources accessed by the plurality of users extracted from the retrieved resource access logs;

computer readable program code to generate a row in the user matrix for a particular user as a feature vector for the particular user, wherein the feature vector includes all action/resource pairs associated with the particular user within the plurality of users;

computer readable program code to generate a feature value within the feature vector for an action/resource pair associated with the particular user equal to the number of access logs that record the particular user performing the particular action on the particular resource and to the log of the number of all user/action/resource groupings within the access logs divided by the number of unique users that performed the particular action on the particular resource;

computer readable program code to generate using information extracted from a retrieved resource access log, a user/action/resource grouping based on an identifier of a particular user, a type of action performed by the particular user on a particular resource, and the name of the particular resource accessed by the particular user;

computer readable program code to retrieve the type of action performed by the particular user on the particular resource from the user/action/resource grouping; and computer readable program code to display the user matrix with only those action/resource pairs that do not exceed a threshold for the feature value.

* * * * *